United States Patent [19]

Skornicka et al.

[11] Patent Number: 5,395,152
[45] Date of Patent: Mar. 7, 1995

[54] CONVERTIBLE SLING FASTENER

[75] Inventors: Steven J. Skornicka, Tecumseh; David R. Farkas, Bloomfield Hills, both of Mich.

[73] Assignees: Wickes Manufacturing Co., Charlotte, N.C.; Ford Motor Company, Dearborn, Mich.

[21] Appl. No.: 80,506

[22] Filed: Jun. 24, 1993

[51] Int. Cl.⁶ .............................. B60J 7/08
[52] U.S. Cl. ............................ 296/124; 296/107
[58] Field of Search ............... 296/124, 107, 116, 136, 296/121, 132, 39.1, 39.2

[56] References Cited

U.S. PATENT DOCUMENTS

| | | | |
|---|---|---|---|
| 2,382,635 | 8/1945 | Humer | 296/121 X |
| 2,592,512 | 4/1952 | Fodermaier, Jr. | 296/116 |
| 2,954,999 | 10/1960 | Fingerman et al. | 296/107 |
| 3,143,373 | 8/1964 | Fordyce | 296/107 |
| 3,298,733 | 1/1967 | Kerby et al. | 296/132 X |
| 4,969,679 | 11/1990 | Eyb | 296/124 |

*Primary Examiner*—Joseph Pape
*Attorney, Agent, or Firm*—David A. Greenlee

[57] ABSTRACT

Apparatus and method for attaching the rear edge of the fabric top and a sling to the periphery of a convertible top storage well are disclosed. A convertible vehicle has a top storage well located behind the rear seat for receiving the folded top through a top opening. A sling lines the well and is attached to the well periphery at the top opening. The rear edge of the convertible top cover is attached to a tacking strip which has a plurality of spaced holes that receive threaded studs welded to body structure. A plurality of nuts are screwed onto the studs atop the tacking strip to secure the tacking strip to the well walls. Each nut has an enlarged outwardly rounded head and a retention groove. An elongated strip of elastic material sewn to the sling incorporates a plurality of spaced slotted apertures and a central locating aperture. The slotted apertures are horizontally wider than the fastener heads and vertically smaller than the fastener heads to elastically deform to distort and pass over a head and into a groove. The locating aperture is sized smaller than the head of its mating fastener and has four radial slits forming flaps which deform to pass over the nut head into the retention groove. The sling is attached by pushing the retention members onto the fasteners. The front of the sling is mounted on the seat back by a boot attachment member.

21 Claims, 2 Drawing Sheets

U.S. Patent        Mar. 7, 1995        Sheet 1 of 2        5,395,152
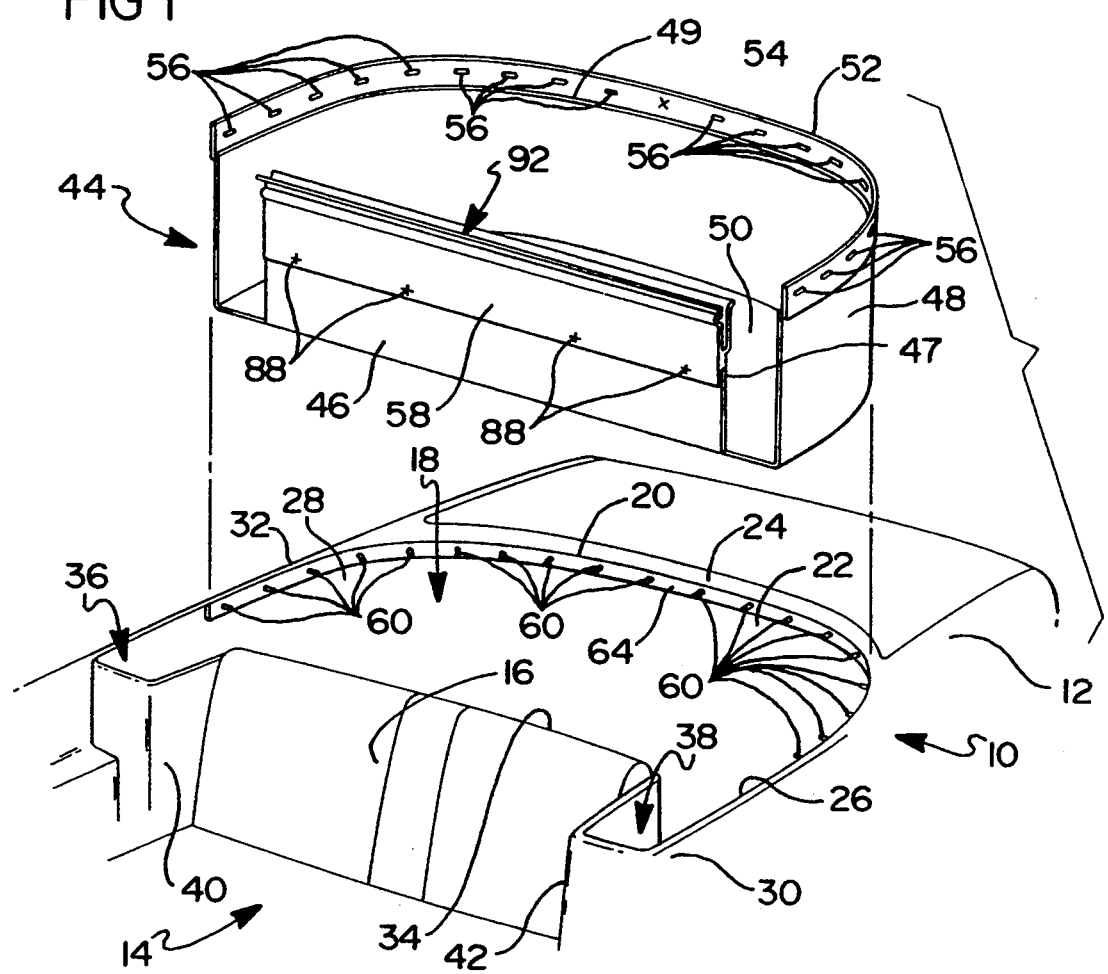
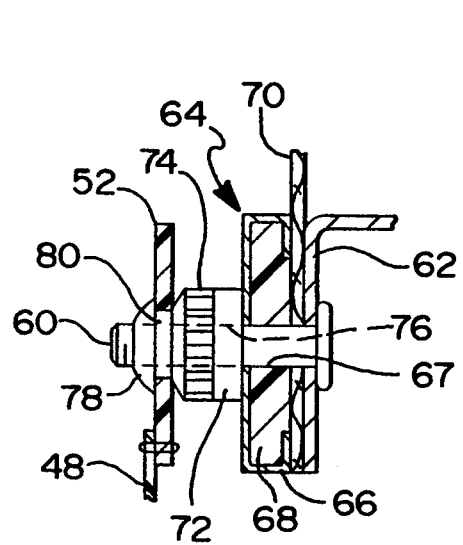
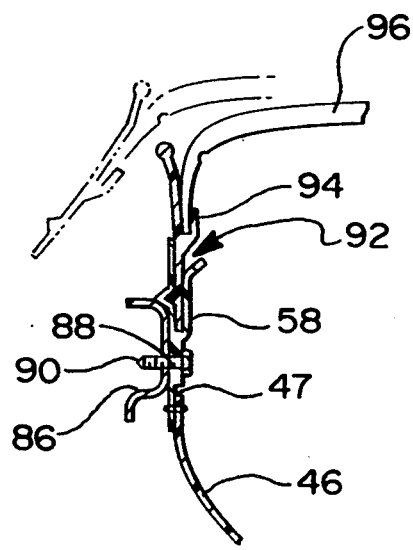

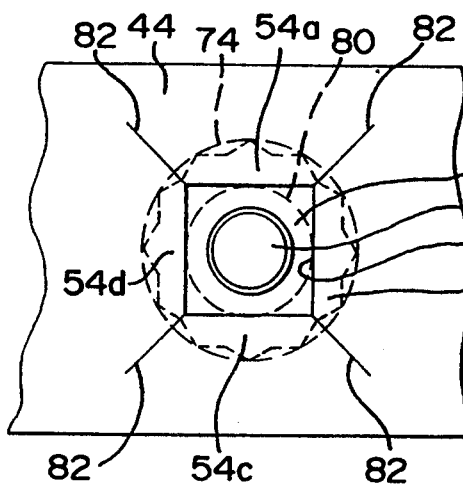
FIG 4
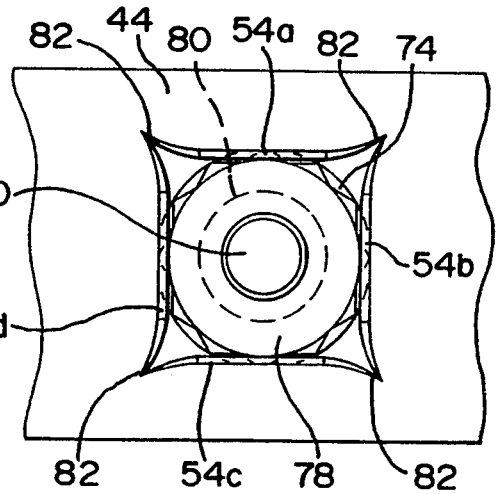
FIG 5
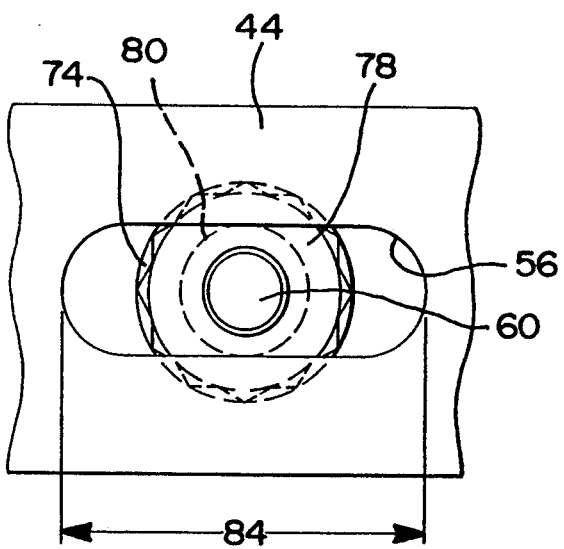
FIG 6
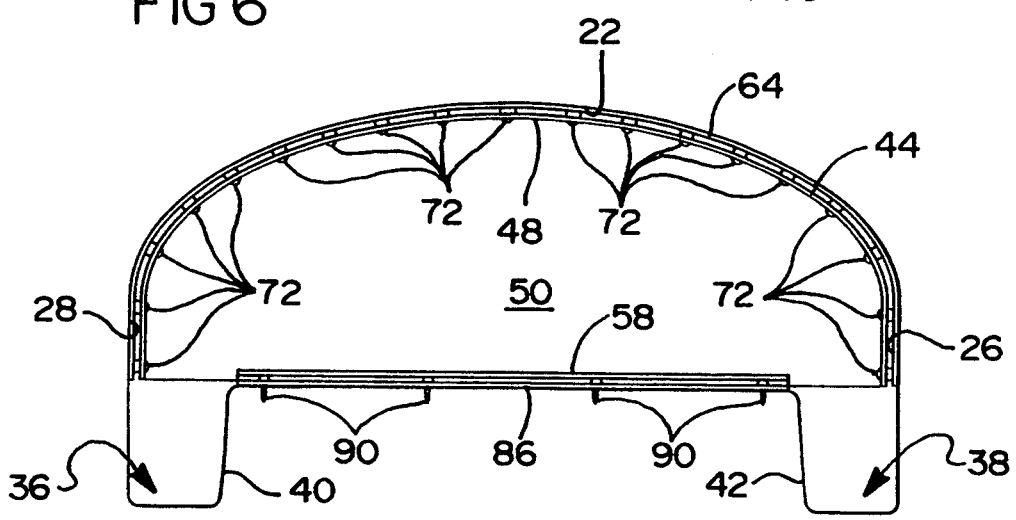
FIG 7
FIG 8

CONVERTIBLE SLING FASTENER

BACKGROUND OF THE INVENTION

This invention relates generally to vehicles having convertible tops and, more particularly, to the attachment of a sling within a convertible top storage well.

Vehicles having folding convertible tops conventionally store the folded top in a storage well compartment in the vehicle behind the rear seat. The well is defined by the seat back and an opening in the vehicle body behind the seat which opens into the vehicle trunk.

It is conventional to secure the rear edge of the top fabric cover of a four-bow top to the vehicle via a tacking strip. The tacking strip conventionally comprises a strip of rolled steel which confines a strip of polypropylene to which the top fabric is stapled. After stapling the fabric, the tacking strip is mounted on studs welded to the vehicle body about the top opening by nuts. It is customary to provide a sling for the lining top storage compartment to separate the stored top from the trunk compartment so that objects in the trunk will not injure or intrude upon the stored top.

This sling is attached to the vehicle body via the tacking strip. Conventional means of attaching the sling to the tacking strip include the use of a plurality of spaced metal screws. Also, snaps are used which comprise a male snap member screwed to the tacking strip and a female button riveted to the sling. If the snaps or screw holes are misaligned, they must be either replaced or not used.

This type of sling attachment is time-consuming and, therefore expensive to mount. In addition, there is no provision for lateral misalignment of the sling in the well. Also, the tacking strip and sling are mounted in separate assembly operations.

It would be desirable to provide an improved attachment means for attaching a sling to a convertible vehicle that is simple, quick and easy.

It would also be desirable to provide an improved attachment means for attaching a sling to a convertible vehicle that allows for misalignment of the attachment means.

It would further be desirable to provide a sling attachment means which enables the tacking strip and the sling to be mounted on the vehicle in a single assembly operation.

SUMMARY OF THE INVENTION

It is therefore an object of this invention to provide an improved attachment means for attaching a sling to a convertible vehicle that is simple, quick and easy.

Another object of this invention is to provide improved attachment means for attaching a sling to a convertible vehicle that allows for misalignment of the attachment means.

A further object of this invention is to provide a sling attachment means which also incorporates means for attaching the convertible top fabric to the vehicle.

In one aspect, this invention features a sling attachment for a convertible vehicle that has a top storage well which comprises a top opening defined by front, back and side walls and a sling lining the well. The sling attachment means comprises a plurality of fasteners mounted on the walls and spaced about the periphery of the top opening, each of which has a retention groove located behind an enlarged head mating retention means are secured to the upper edge of the sling and has apertures sized for retention of the retention means within a fastener groove. The retention means is elastically deformable to enlarge its aperture and allow the retention means to pass over the fastener heads and into the grooves. This enables attachment of the sling to the well walls by pushing the retention means onto the fasteners.

Preferably, the retention means is a strip of elastic material, each aperture is an elongated slot that is horizontally wider than a fastener head and vertically smaller than the fastener head, enabling compensation for horizontal misalignment of the studs relative to the retention means apertures. A central locating aperture is included which is formed centrally of the strip and is sized smaller than the head of a mating fastener located centrally of the storage well rear wall to accurately locate the sling laterally relative to the well walls, and the strip includes slits connecting to the locating aperture to provide flaps which are elastically deformable to enlarge the aperture sufficiently to pass over the fastener head.

In another aspect, this invention features attachment means for attaching a sling and a tacking strip to a convertible vehicle which has a top storage well that comprises a top opening defined by a seat back, and side and rear walls of vehicle structure, a sling lining the well, and a tacking strip for securing an edge of the convertible top cover to the well side and rear walls. The attachment means comprises a plurality of studs mounted on and spaced about the well side and rear walls adjacent the top opening, a plurality of spaced mounting holes in the tacking strip for receiving the studs, a plurality of fasteners, and mating retention means secured to the upper edge of the sling. Each fastener includes a body for engaging the studs atop the tacking strip to secure the tacking strip to the well walls, an enlarged head, and a retention groove located between the head and body. The retention means has an aperture sized for retention of the retention member within a fastener groove, and is elastically deformable to pass over a head and into a groove, thus enabling attachment of the sling to the vehicle structure by pushing the retention means onto the fasteners.

Preferably, the head of each fastener is outwardly rounded to facilitate deformation of the retention means to enlarge an aperture as the retention means is pushed onto a fastener, each stud is threaded, and each fastener has a threaded bore for engagement with a stud. Also, the front edge of the sling is secured to the seat back by a boot attachment member.

In yet another aspect, this invention features a method of attaching the rear edge of a fabric top and a storage well sling to a convertible vehicle having a top storage well comprising a top opening defined by a seat back, and side and rear walls of vehicle structure, comprising the steps of mounting a plurality of studs on and spaced about the well side and rear walls adjacent the top opening, providing a tacking strip having a plurality of spaced mounting holes, attaching the rear edge of the fabric top to the tacking strip, aligning the holes with the studs and mounting the tacking strip on the studs, providing a plurality of fasteners, each including a body for engaging the studs atop the tacking strip to secure the tacking strip to the well walls, an enlarged head, and a retention groove located between the head and body, mounting the fasteners on the studs to secure the tacking strip to the vehicle body, attaching mating retention means to the upper edge of the sling, having apertures sized for retention of the retention means within fastener grooves and being elastically deformable to pass over the heads and into the grooves, and pushing the retention means onto the fasteners over the heads and into the grooves to attach the sling to the vehicle structure.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 1 is an exploded perspective partial view of a convertible vehicle incorporating means for attaching a top storage well sling to the vehicle, according to this invention;

FIG. 2 is an enlarged sectional view of the attachment means for mounting the top and sling rear and sides to the vehicle according to this invention;

FIG. 3 is an enlarged sectional view of the attachment means for mounting the front of the sling to the vehicle seat back, according to this invention;

FIG. 4 is an enlarged partial elevation of the attachment locating retention means, according to this invention, shown prior to installation;

FIG. 5 is a view similar to FIG. 4, showing the retention means during installation;

FIG. 6 is an enlarged partial elevation of a slotted attachment retention means, according to this invention, shown prior to installation;

FIG. 7 is a view similar to FIG. 6, showing the retention means during installation; and FIG. 8 is a plan view of the vehicle storage well, showing the sling installed.

DETAILED DESCRIPTION OF A PREFERRED EMBODIMENT

As shown in FIG. 1 of the drawings, a convertible passenger vehicle 10 includes a body 12 housing a passenger compartment 14 which includes a rear seat having a seat back 16. A convertible top storage well 18 is provided behind seat back 16 for storing a folded convertible top (not illustrated) in a well-known manner.

Storage well 18 has a top opening 20 bounded by a rear wall 22 defined by the rear deck 24, and side walls 26, 28 defined by exterior body rear quarter panels 30 and 32, and a front wall 34 defined by seat back 16. Storage well 18 includes extensions 36 and 38 forwardly of seat back 16 bounded by interior quarter trim panels 40 and 42 for receiving the convertible top folding side linkages (not illustrated) in a well-known manner.

Storage well 18 receives a fabric sling 44 which lines well 18 and defines the actual compartment for storage of the conventional folded top. Sling 44 includes a front wall 46 having an upper edge 47, a part-peripheral continuous side-and-rear wall 48 having an upper edge 49 and a bottom wall 50.

A polypropylene or other plastic retention means or strip 52 is sewn or otherwise secured to sling wall top edge 49, as shown in FIG. 2. Retention strip 52 includes a central locating aperture 54 (FIGS. 4 and 5) flanked by a plurality of elongated retention apertures 56 (FIGS. 6 and 7). A polypropylene or other plastic fastening strip 58 (FIG. 3) is sewn or otherwise secured to front wall top edge 47.

Referring now to FIGS. 1, 2 and 8, a plurality of spaced, threaded studs 60 are welded to the vehicle upper back structure 62 beneath rear deck 20 adjacent the top edge of well 18. A conventional tacking strip 64 comprises an extruded metal sheath 66 that encloses a plastic strip 68 to which the bottom edge 70 of the top fabric is stapled or tacked (see FIG. 2). Tacking strip 64 includes spaced mounting holes 67 which are received over studs 60 to locate the convertible top fabric bottom edge 70 on vehicle body 12.

A plurality of fasteners in the form of plastic-over-molded steel nuts 72 are threaded onto studs 60 to clamp tacking strip 64 to upper back structure 62. This secures the bottom edge 70 of the convertible top to body vehicle 12 about the periphery of top storage well 18. Fastener nuts 72 also function to mount sling 44 about the periphery of well top opening 20, as will now be explained.

As shown in FIGS. 2 and 4-7, each nut 72 comprises a faceted body 74, a threaded bore 76, an outwardly-rounded head 78 and an intermediate retention groove 80. FIG. 1 shows that retention strip 52 includes nine spaced, elongated apertures or slots 56 located on either side of locating aperture 54. Each of the apertures 54 and 56 are received on nuts 72 and each define a separate retention member which, for the sake of economy and assembly convenience, are formed together in a single retention strip 56. Otherwise, apertures 54 and 56 could be contained in separate individual retention strip segments or could be ganged in several multi-apertured strips.

Central locating aperture 54 is a square die-cut hole in strip 52 having a side length substantially equal to the diameter of nut retention groove 80. Four die-cut slits 82 extend from the corners of aperture 54, forming flexible flaps 54a, 54b, 54c and 54d. Although shown square, locating aperture 54 could be circular, having a diameter smaller than that of nut head 78, but larger than that of groove 80, and including slits 82 for enlargement.

Elongated apertures 56 comprise elongated slots die cut in strip 52 that have a height approximately equal to the diameter of nut retention grooves 80. The width 84 of slots 56 is sufficient to make the circumference of the slot substantially larger than the circumference of nut head 78.

Mounting of sling 44 in well 18 by an assembly worker is extremely quick and simple. Sling 44 is positioned in well 18 with apertures 54 and 56 adjacent nuts 72, as shown in FIGS. 4 and 6. The worker's fingers are positioned on strip 52 astride aperture 54 and the strip merely is pushed onto and over nut head 78. FIG. 5 shows how aperture flaps 54a, 54b, 54c and 54d deform during mounting to enable strip 52 to pass over head 78 until the flaps enter retention groove 80.

Next, strip 52 is pushed onto each remaining nut head 78. This causes each slot to deform and enlarge to fit over head 78, as shown in FIG. 7, until strip 52 is trapped into retention grooves 80, as shown in FIG. 2. This push-on procedure enable a worker to quickly and easily mount side-and-rear wall 48 of sling 44 within well 18.

Each nut head 78 is plastic coated and is outwardly rounded to facilitate deformation of aperture 54 and slots 56 to fit over heads 78 to move strip 52 into retention grooves 80. Aperture 54 locates sling 44 laterally of vehicle body 12, while elongated slots 56 compensate for any mislocation of studs 60.

After side-and-rear wall 48 of sling 44 is mounted as described above, front wall 46 is mounted as shown in FIG. 3. A body mounting bracket 86 is located adjacent seat back 16. Fastening strip 58 includes mounting holes 88 that receive sheet metal screws 90 which engage bracket 86. Strip 58 includes a transverse pocket 92 which releasably receives a tongue 94 on the front edge of a tonneau 96. Thus, fastening strip 58 serves the dual functions of attaching the front edges of both sling 44 and tonneau 96 to the vehicle.

Thus, this invention provides an improved attachment means for attaching a sling to a convertible vehicle that is simple, quick and easy, allows for fastener misalignment, and also attaches the convertible top fabric to the vehicle.

While only a preferred embodiment has been illustrated and described, obvious modifications thereof are contemplated within the scope of this invention and the following claims.

We claim:

1. In a convertible vehicle having a top storage well comprising a top opening defined by front, back and side walls and a sling lining the well, attachment means comprising
    a plurality of fasteners mounted on the walls and spaced about the periphery of the top opening, each having a retention groove located behind an enlarged head, and
    mating retention means secured to the upper edge of the sling, having apertures sized for retention within the fastener grooves,
    the retention means being elastically deformable to enlarge the apertures to allow the retention means to pass over the fastener heads and into the grooves, enabling attachment of the sling to the well walls by pushing the retention means onto the fasteners.

2. The attachment means of claim 1, wherein the retention means comprise a piece of elastic material secured to the sling and incorporating the apertures.

3. The attachment means of claim 2, wherein each aperture is an elongated slot that is horizontally wider than a fastener head and vertically smaller than the fastener head, enabling compensation for horizontal misalignment of the studs relative to the retention means apertures.

4. The attachment means of claim 3, wherein the apertures are sufficiently wide to be elastically deformable to form an aperture vertically larger than the heads.

5. The attachment means of claim 3, including a locating aperture formed centrally of the rear wall of the sling which is sized smaller than the head of a mating fastener located centrally of the storage well rear wall to accurately locate the sling laterally relative to the well walls, and slits in the strip connecting to the locating aperture to provide flaps which are elastically deformable to enlarge the aperture sufficiently to pass over the fastener head.

6. The attachment means of claim 1, wherein the retention means is an elongated strip of elastic material secured to the sling and having the apertures spaced thereon.

7. The attachment means of claim 6, including a locating aperture formed centrally of the strip of the sling which is sized smaller than the head of a mating fastener located centrally of the storage well rear wall to accurately locate the sling laterally relative to the well walls, and slits in the strip connecting to the locating aperture to provide flaps which are elastically deformable to enlarge the aperture sufficiently to pass over the fastener head.

8. The attachment means of claim 7, wherein the head of each fastener is outwardly rounded to facilitate deformation of the attachment member to enlarge the aperture.

9. The attachment means of claim 8, including a threaded bore in each fastener for engagement with a threaded stud secured to a well wall.

10. The attachment means of claim 9, wherein the fasteners are spaced around the well side walls and back wall.

11. In a convertible vehicle having a top storage well comprising a top opening defined by a seat back, and side and rear walls of vehicle structure, a sling lining the well, and a tacking strip for securing an edge of the convertible top cover to the well side and rear walls, attachment means comprising
    a plurality of studs mounted on and spaced about the well side and rear walls adjacent the top opening,
    a plurality of spaced mounting holes in the tacking strip for receiving the studs,
    a plurality of fasteners, each including a body for engaging the studs atop the tacking strip to secure the tacking strip to the well walls, an enlarged head, and a retention groove located between the head and body, and
    mating retention means secured to the upper edge of the sling, having apertures sized for retention within the fastener grooves,
    the retention means being elastically deformable to pass over the heads and into the grooves, enabling attachment of the sling to the vehicle structure by pushing the retention means onto the fasteners.

12. The attachment means of claim 11, wherein the retention means are incorporated in an elongated strip of elastic material secured to the sling and having a plurality of spaced apertures.

13. The attachment means of claim 12, wherein the spaced apertures are elongated slots that are horizontally wider than the fastener heads and vertically smaller than the fastener heads, enabling compensation for horizontal misalignment of the studs relative to the retention means apertures.

14. The attachment means of claim 13, wherein the apertures are sufficiently wide to be elastically deformable to be vertically larger than the heads.

15. The attachment means of claim 13, including a locating aperture formed centrally of the strip and sized smaller than the head of a mating fastener located centrally of the storage well, rear wall to accurately locate the sling relative to the vehicle structure, and slits in the strip connecting to the locating aperture to provide flaps which are elastically deformable to enlarge the aperture sufficiently to pass over the fastener head.

16. The attachment means of claim 11, wherein the head of each fastener is outwardly rounded to facilitate deformation of the attachment means to enlarge an aperture as the retention means is pushed onto a fastener.

17. The attachment means of claim 16, wherein each stud is threaded and each fastener has a threaded bore for engagement with a stud.

18. The attachment means of claim 11, including means for securing the sling to the seat back.

19. The attachment means of claim 18, wherein the securing means also function to mount a boot attachment member to the seat back.

20. In a convertible vehicle having a top storage well comprising a top opening defined by a seat back, and side and rear walls of vehicle structure, a sling lining the well, and a tacking strip for securing an edge of the convertible top cover to the well side and rear walls, attachment means comprising a plurality of threaded studs mounted on and spaced about the well side and rear walls adjacent the top opening, a plurality of spaced mounting holes in the tacking strip for receiving the studs, a plurality of plastic-overmolded steel fastener nuts, each having a threaded bore for engaging a stud atop the tacking strip to secure the tacking strip to the well walls, an enlarged outwardly rounded head, and a retention groove located between the head and body, and mating retention means comprising an elongated strip of elastic material secured to the sling and having a plurality of spaced apertures each sized for retention within a fastener groove, the apertures comprising a locating aperture and a plurality of elongated slots that are horizontally wider than the fastener heads and vertically smaller than the fastener heads, enabling compensation for horizontal misalignment of the studs relative to the retention apertures, each slot being elastically deformable to distort and pass over a head and into a groove, enabling attachment of the sling to the vehicle structure by pushing the retention means onto the fasteners, the locating aperture being formed centrally of the strip and sized smaller than the head of a mating fastener located centrally of the storage well rear wall to accurately locate the sling relative to the vehicle structure, and connecting to slits in the strip to provide flaps which are elastically deformable to enlarge the aperture sufficiently to pass over the fastener head, whereby the outwardly rounded head of each fastener facilitates deformation of the retention means to enlarge the aperture as the retention means is pushed onto a fastener.

21. A method of attaching the rear edge of a fabric top and a storage well sling to a convertible vehicle having a top storage well comprising a top opening defined by a seat back, and side and rear walls of vehicle structure, comprising the steps of mounting a plurality of studs on and spaced about the well side and rear walls adjacent the top opening, providing a tacking strip having a plurality of spaced mounting holes, attaching the rear edge of the fabric top to the tacking strip, aligning the holes with the studs and mounting the tacking strip on the studs, providing a plurality of fasteners, each including a body for engaging the studs atop the tacking strip to secure the tacking strip to the well walls, an enlarged head, and a retention groove located between the head and body, mounting the fasteners on the studs to secure the tacking strip to the vehicle body, attaching mating retention means to the upper edge of the sling having apertures sized for retention of the retention means within the fastener grooves and being elastically deformable to pass over the heads and into the grooves, and pushing the retention means onto the fasteners over the heads and into the grooves to attach the sling to the vehicle structure.

* * * * *